(12) United States Patent
Spakowski et al.

(10) Patent No.: US 7,213,613 B2
(45) Date of Patent: May 8, 2007

(54) HIGH-FLOW DUAL POPPET VALVE HAVING EQUALIZED CLOSING FORCES

(75) Inventors: Joseph G. Spakowski, Rochester, NY (US); John G. Habets, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 107 days.

(21) Appl. No.: 11/151,983

(22) Filed: Jun. 14, 2005

(65) Prior Publication Data

US 2006/0278286 A1    Dec. 14, 2006

(51) Int. Cl.
*F16K 43/00* (2006.01)

(52) U.S. Cl. .............. 137/614.21; 251/250; 123/568.2; 123/568.23

(58) Field of Classification Search ........ 137/613, 137/614.21, 614.11, 625; 251/84, 85, 360, 251/250; 123/561.12, 568.11–568.32
See application file for complete search history.

(56) References Cited

U.S. PATENT DOCUMENTS

| | | | | |
|---|---|---|---|---|
| 1,402,604 A * | 1/1922 | Harvey | ........... | 137/614.21 |
| 1,500,820 A * | 7/1924 | Jones | ........... | 137/424 |
| 1,519,507 A * | 12/1924 | Rath | ........... | 137/585 |
| 1,557,175 A * | 10/1925 | Larner | ........... | 137/220 |
| 1,636,661 A * | 7/1927 | Larner | ........... | 137/625 |
| 1,851,016 A * | 3/1932 | Skelly | ........... | 251/235 |
| 2,074,701 A * | 3/1937 | Lohmolder | ........... | 137/614.11 |
| 2,464,852 A * | 3/1949 | De Lisa | ........... | 137/635 |
| 4,278,063 A * | 7/1981 | Nakamura et al. | ........... | 123/568.2 |
| 4,351,501 A * | 9/1982 | Peash et al. | ........... | 137/614.11 |
| 4,473,056 A * | 9/1984 | Ishida et al. | ........... | 123/568.23 |
| 5,325,888 A * | 7/1994 | Stary | ........... | 137/553 |
| 5,937,835 A * | 8/1999 | Turner et al. | ........... | 123/568.24 |
| 6,247,461 B1* | 6/2001 | Smith et al. | ........... | 123/568.2 |
| 6,279,552 B1* | 8/2001 | Okada et al. | ........... | 123/568.2 |
| 6,382,195 B1* | 5/2002 | Green et al. | ........... | 123/568.23 |
| 6,626,201 B1* | 9/2003 | Kim | ........... | 137/1 |
| 7,011,081 B2* | 3/2006 | Hrytzak et al. | ........... | 123/568.17 |
| 2002/0174858 A1* | 11/2002 | Kato et al. | ........... | 123/568.12 |

* cited by examiner

*Primary Examiner*—Eric Keasel
*Assistant Examiner*—Craig Price
(74) *Attorney, Agent, or Firm*—Paul L. Marshall

(57) ABSTRACT

A dual-poppet valve comprising a valve body having spaced-apart coaxial valve seats and being arranged such that first and second poppets both open into the primary chamber. A first pintle shaft engages the first poppet, and a second pintle shaft engages the second poppet. A motorized actuator having a gear transmission includes a pinion gear. The pintle shafts include opposing gear racks, and the pinion gear engages both racks. Thus, rotation of the pinion gear in a first direction causes both poppets to be lifted from their seats simultaneously, in opposite directions; and counter-rotation engages each poppet with its respective seat. In closing, one poppet engages its seat slightly before the other poppet engages the other seat. The first pintle slides through the first poppet until the second poppet is fully seated by the actuator. The force of the spring fully engages the first poppet with the first seat.

10 Claims, 2 Drawing Sheets

HIGH-FLOW DUAL POPPET VALVE HAVING EQUALIZED CLOSING FORCES

TECHNICAL FIELD

The present invention relates to actuation of pintle-type valves; more particularly, to devices for positively actuating a dual-poppet valve in both the opening and the closing directions; and most particularly, to a dual pintle, dual-poppet valve actuated by an electric motor and a rack and pinion transmission.

BACKGROUND OF THE INVENTION

Pintle or poppet valves are well known. For example, it is known to provide a pintle valve between the exhaust manifold and the intake manifold of an internal combustion engine for recirculating a portion of the engine exhaust into the intake air stream. Such a valve is known in the art as an exhaust gas recirculation (EGR) valve.

An EGR valve comprises two basic component groups: a valve group itself and an actuator group. Typical EGR valve actuators include solenoids, torque motors, stepper motors, and DC motors. The actuator, coupled with an appropriate driver, moves the valve group to a desired position based on commands from an engine control module (ECM). The actuator group also typically includes a position feedback sensor that monitors the position of the valve group and provides position feedback to the ECM so that the ECM can adjust its commands to the actuator accordingly. This closed-loop control system operates continuously while the engine is running to provide the correct amount of recirculated exhaust gas under all engine operating conditions.

Different size engines and/or different emission regulations require different flow capabilities from an EGR valve system. Some known EGR valves have single-poppet valve groups, wherein one poppet lifts off of one seat to allow exhaust gas to pass. Single-poppet valve groups in general have excellent sealing capability. Other known EGR valves have dual-poppet valve groups to meet very high flow requirements. Dual-poppet valve groups are known in the art generally to have rather poor sealing capability because it is very difficult to have both poppets make contact with their seats at the same time and with the same force.

Prior art dual-poppet valves have both poppets fixed to a common pintle shaft, and both valves open in the same direction. For both poppets to seal properly, the poppet spacing on the pintle shaft must be exactly the same as the spacing between the valve seats. In practice this is virtually impossible to achieve, so that, in closing, one or the other poppet will strike its own seat first, and the other poppet will be thus prevented from sealing against its own seat with the same degree of closure.

What is needed in the art is a dual-poppet valve capable of high flow but also capable of optimal sealing, like a single-poppet valve.

It is a principal object of the present invention to provide a high flow dual-poppet valve wherein both poppets seal fully in the closed position.

SUMMARY OF THE INVENTION

Briefly described, a dual-poppet valve in accordance with the invention comprises a valve body having first and second spaced-apart coaxial valve seats separating a primary chamber from first and second secondary chambers, respectively. The valve seats are arranged such that first and second poppets in the primary chamber operate in opposed fashion, both opening into the primary chamber. An actuator having an electric motor and a gear train transmission is disposed on the valve body adjacent the second secondary chamber. A first pintle shaft extends from the actuator through the second secondary chamber, into the primary chamber, and through the second poppet to engage the first poppet which preferably is slidingly retained on the first pintle shaft. A coil spring is disposed around the first pintle and is compressed between the back sides of the two poppets. A second pintle shaft parallel to the first pintle shaft extends from the actuator through the secondary chamber and into the primary chamber to engage the second poppet. The first and second pintle shafts are provided with opposing gear racks, and a pinion gear of the transmission is disposed between and engages both racks. Thus, rotation of the pinion gear in a first direction causes both poppets to be lifted from their seats simultaneously, in opposite directions; and counter-rotation of the pinion gear serves to engage each poppet with its respective seat. In closing, one poppet engages its seat slightly before the other poppet engages the other seat. The pintles continue their travel, the first pintle sliding through the first poppet, until the second poppet is fully seated by the actuator, the force of the spring fully engaging the first poppet with the first seat.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
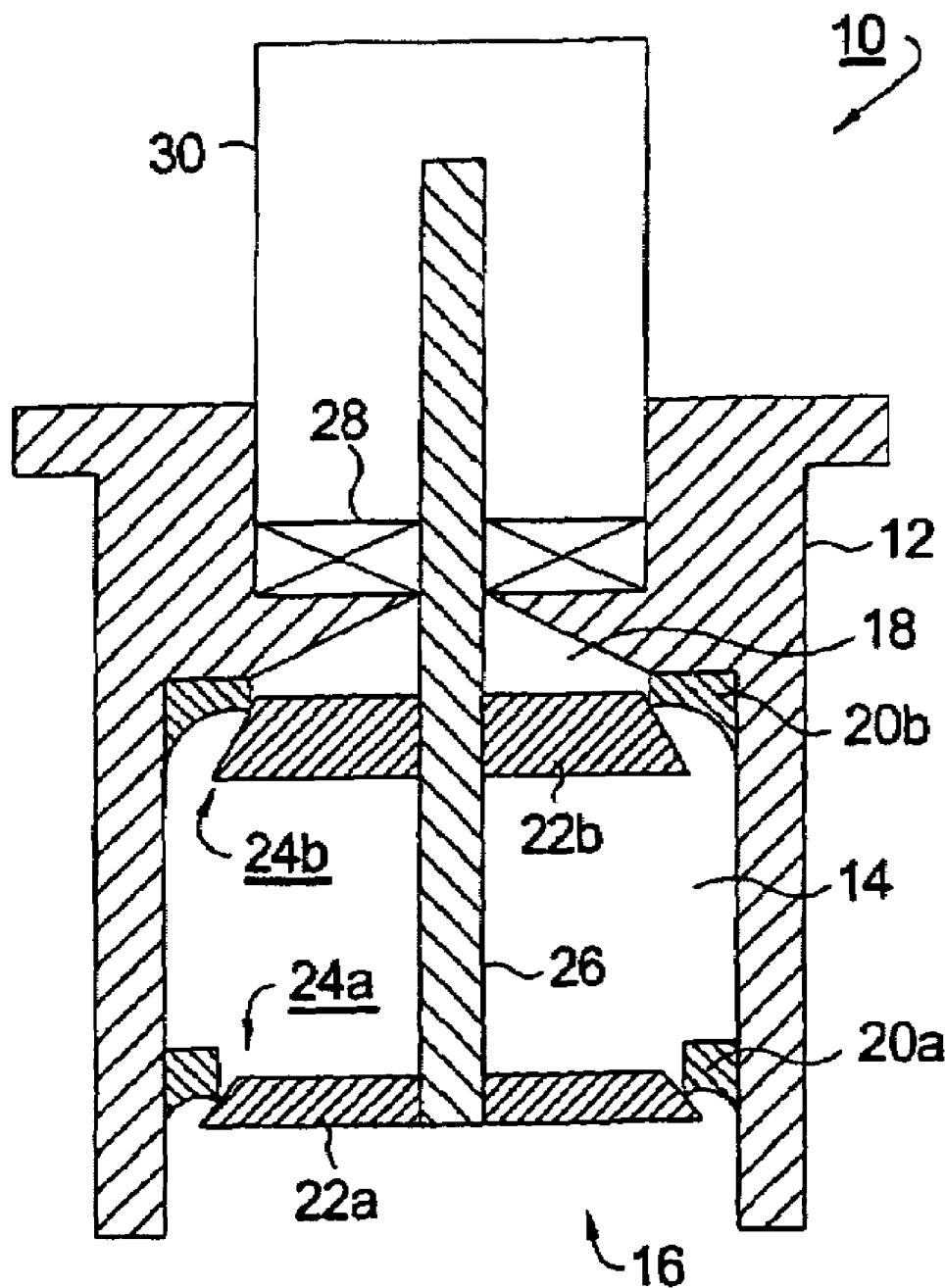
FIG. 1 is an elevational cross-sectional view of a prior art dual-poppet valve assembly.

Referring to FIG. 1, a prior art dual-poppet valve assembly 10 comprises a valve body 12 defining a primary chamber 14, a first secondary chamber 16, and a second secondary chamber 18. A first valve seat 20a separates primary chamber 14 and first secondary chamber 16; and a second valve seat 20b separates primary chamber 14 and second secondary chamber 18. A first poppet 22a mates with first valve seat 20a defining a first valve 24a, and a second poppet 22b mates with second valve seat 20b defining a second valve 24b. First and second valve seats 20a,20b face in the same direction such that first valve 24a opens out of chamber 14 and second valve 24b opens into chamber 14. First and second poppets 22a,22b are fixedly disposed on a common pintle shaft 26 at a nominal axial spacing equal to the spacing between. seats 20a,20b such that valves 24a,24b are intended to open and close simultaneously. Pintle shaft 26 is journaled in seal/bearing 28 and is actuated by a generic linear actuator 30 mounted on valve body 12.

As described above, it is extremely difficult, and practically impossible, to construct a prior art dual-poppet valve in accordance with FIG. 1 which has the first and second valves closing truly simultaneously and seating with the same closing force on each poppet.

Figure 2:
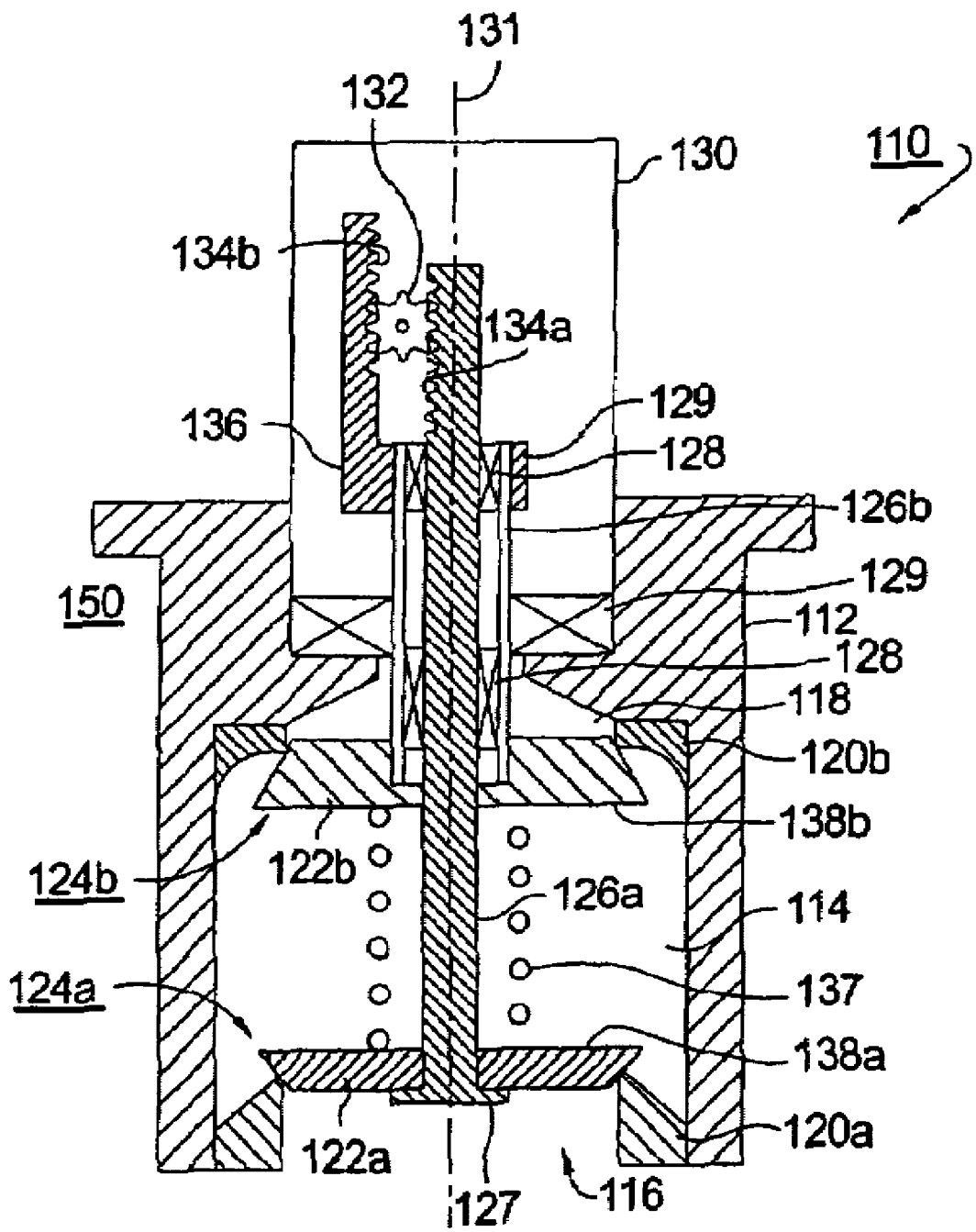
FIG. 2 is an elevational cross-sectional view of a dual-poppet valve assembly in accordance with the invention.

Referring to FIG. 2, a dual-poppet valve assembly 110 in accordance with the invention comprises a valve body 112 defining a primary chamber 114, a first secondary chamber 116, and a second secondary chamber 118. A first valve seat 120a separates primary chamber 114 and first secondary chamber 116; and a second valve seat 120b separates primary chamber 114 and second secondary chamber 118. A first poppet 122a mates with first valve seat 120a defining a first valve 124a, and a second poppet 122b mates with second valve seat 120b defining a second valve 124b. First and second valve seats 120a,120b face in opposite directions such that both first valve 124a and second valve 124b open into chamber 114. First poppet 122a is slidably disposed on a first pintle shaft 126a, the poppet being retained by a terminal flange 127 on shaft 126a, and the shaft being journaled in inner bearings 128 and extending through second poppet 122b and chamber 114. Second poppet 122b is fixedly disposed on a second pintle shaft 126b which is a cylindrical element coaxial with first pintle shaft 126a and off-spaced therefrom by inner bearings 128 and journaled in outer bearings 129. Thus the pintle shafts 126a,126b are coaxially and slidably disposed with respect to one another such that poppets 122a,122b are also independently actuable along the same axis 131.

Within a motorized actuator 130 mounted on valve body 112, a gear-train transmission (not shown) includes a pinion gear 132 which is actuable for both clockwise (CW) and counter-clockwise (CCW) rotation. First pintle shaft 126a is provided with a first rack gear 134a in meshing relationship with pinion gear 132. Second pintle shaft 126b is provided with an offset shaft extension 136 comprising a second rack gear 134b also in meshing relationship with pinion gear 132 opposite first rack gear 134a. Thus, rotation of pinion gear 132 causes pintle shafts 126a,126b to be driven in equal and opposite directions. A coil spring 137 is disposed within chamber 114 around first pintle shaft 126a and is seated in compressional bias on opposing faces 138a,138b of first and second poppets 122a,122b.

In operation from the position shown in FIG. 2, CCW rotation of gear 132 drives rack gear 134a upward, opening valve 124a by engagement of flange 127 therewith, and drives rack gear 134b downward, opening valve 124b, thereby allowing fluid (EGR gas in the case of an EGR valve) to flow between primary chamber 114 and secondary chambers 116, 118.

Conversely, from an open valve position, CW rotation of gear 132 drives rack gear 134a downward, closing valve 124a by allowing poppet 122a to seat against valve seat 120a; such rotation also drives rack gear 134b upward, closing valve 124b by urging poppet 122b to seat against valve seat 120b approximately synchronous with the closing of valve 124a. At this point, spring 136 is loaded against both poppets 122a,122b, urging them apart. Because first poppet 122a is slidably disposed on first pintle shaft 126a, and because of mechanical lash inherent in the gear train, the full force of spring 136 is brought to bear on both poppets such that the poppets experience equal sealing forces against their respective seats. In a currently-preferred embodiment, first seat 120a is adjustable axially of body 112 as by threading of the seat into the body so that the timing and seating of poppets against seats can occur as just described. In some applications, such seat adjustment can permit first poppet 122a to be fixedly mounted on first pintle shaft 126a.

In a currently-preferred use, valve 110 is disposed in known fashion on an internal combustion engine 150 between the exhaust system and air intake system thereof.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A dual-poppet valve, comprising:
   a) a valve body having a primary chamber, a first secondary chamber, and a second secondary chamber;
   b) a first valve seat between said primary chamber and said first secondary chamber;
   c) a second valve seat between said primary chamber and said second secondary chamber;
   d) a first poppet cooperative with said first valve seat to define a first valve opening in a first direction respective of said primary chamber;
   e) a second poppet cooperative with said second valve seat to define a second valve opening in a second direction respective of said primary chamber, such that said first and second valves open in opposite directions respective of each other;
   f) a first pintle shaft extending through said second poppet and supportive of said first poppet;
   g) a second pintle shaft supportive of said second poppet;
   h) a first rack disposed on said first pintle shaft;
   i) a second rack disposed on said second pintle shaft; and
   j) a pinion disposed between said first and second racks for driving said first and second pintle shafts in opposite directions to open and close said first and second valves.

2. A dual-poppet valve in accordance with claim 1 further comprising a spring disposed between said first and second poppets.

3. A dual-poppet valve in accordance with claim 1 wherein said pinion is operated by an electric motor actuator.

4. A dual-poppet valve in accordance with claim 3 wherein said actuator is mounted on said valve body.

5. A dual-poppet valve in accordance with claim 1 wherein said pinion is a pinion gear and said first and second racks are rack gears.

6. A dual-poppet valve in accordance with claim 1 wherein said second pintle shaft includes a cylindrical portion surrounding said first pintle shaft.

7. A dual poppet valve in accordance with claim 1 wherein said first poppet is slidably disposed on said first pintle shaft and is retained thereupon by a terminal flange.

8. A dual-poppet valve in accordance with claim 1 wherein said valve is an exhaust gas recirculation valve for an internal combustion engine.

9. A dual-poppet valve in accordance with claim 1 wherein at least one of said first and second valve seats is axially adjustable in position within said valve body.

10. An internal combustion engine comprising an exhaust gas recirculation valve, wherein said valve includes
    a valve body having a primary chamber, a first secondary chamber, and a second secondary chamber,
    a first valve seat between said primary chamber and said first secondary chamber,
    a second valve seat between said primary chamber and said second secondary chamber,
    a first poppet cooperative with said first valve seat to define a first valve opening in a first direction respective of said primary chamber,
    a second poppet cooperative with said second valve seat to define a second valve opening in a second direction respective of said primary chamber, such that said first and second valves open in opposite directions respective of each other, a first pintle shaft extending through said second poppet and supportive of said first poppet,
a second pintle shaft supportive of said second poppet,
a first rack disposed on said first pintle shaft,
a second rack disposed on said second pintle shaft, and
a pinion disposed between said first and second racks for driving said first and second pintle shafts in opposite directions to open and close said first and second valves.

* * * * *